United States Patent Office 3,287,395
Patented Nov. 22, 1966

3,287,395
DIELS-ALDER REACTION PRODUCTS
Wen-Hsuan Chang, Gibsonia, Pa., assignor to Pittsburgh Plate Glass Company, Pittsburgh, Pa., a corporation of Pennsylvania
No Drawing. Filed May 2, 1963, Ser. No. 277,438
6 Claims. (Cl. 260—468)

This invention relates to novel unsaturated compounds prepared from the Diels-Alder reaction of an alkenyl substituted cyclopentadiene and an alpha, beta-ethylenically unsaturated carboxylic acid, and to novel polyesters prepared therefrom. More particularly, this invention pertains to novel Diels-Alder adducts of an alkenyl substituted cyclopentadiene having the structure:

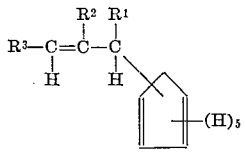

wherein $R^1$, $R^2$ and $R^3$ are members of the class consisting of hydrogen, aryl groups and lower alkyl groups; and an alpha, beta-ethylenically unsaturated carboxylic acid, wherein this term as used in this specification and claims includes monocarboxylic acids and polycarboxylic acids and their corresponding anhydrides; and to novel polyesters prepared therefrom.

The novel unsaturated carboxylic compounds of this invention possess the following representative structure:

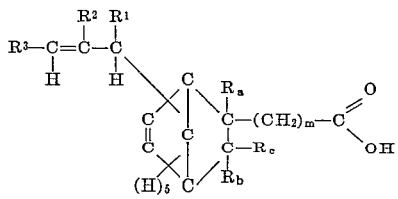

wherein $R^1$, $R^2$ and $R^3$ have the significance set forth above, $R_a$ is hydrogen, a lower alkyl group or $-CH_2COOH$, $R_b$ is hydrogen or a lower alkyl group, and $R_c$ is hydrogen, a lower alkyl group or

where $m$ is a number from 0 to 1, and wherein $m$ is 0 when $R_c$ is a lower alkyl group. This structure also represents the anhydrides of dicarboxylic acids when an alpha, beta-ethylenically unsaturated dicarboxylic acid anhydride is used in the preparation of the novel compounds of this invention.

As indicated above, the novel unsaturated compounds are prepared by reacting an alkenyl substituted cyclopentadiene with an alpha, beta-ethylenically unsaturated carboxylic acid or anhydride thereof. The reaction proceeds substantially as follows, wherein 1-allylcyclopentadiene and maleic anhydride are used for illustrative purposes:

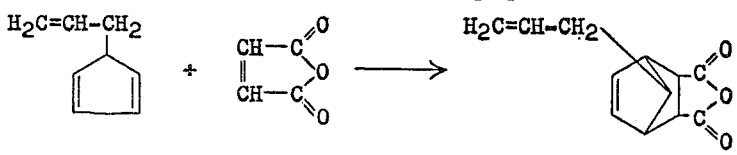

The reaction occurs whenever the reactants are brought together in effective contact. The reaction is exothermic and occurs over a wide range of temperatures, however, it is generally preferred to maintain the reaction temperature between 0° C. or below and 200° C. or higher. If desired, heat may be applied to the admixed reactants or the acid reactant may be preheated prior to addition to the alkenyl substituted cyclopentadiene reactant to accelerate the reaction. Also, it is generally preferred to conduct the reaction in the presence of a solvent, such as benzene, toluene, xylene, naphthalene, hexane, heptane, decane, mineral spirits and the like, as better control of the reaction results and the occurrence of undesirable side reactions is minimized. A slight excess of the acid reactant is generally preferred as this also tends to minimize undesirable side reactions.

These novel compounds can be purified by distillation or other appropriate means, however, for many purposes the crude reaction product is utilizable.

The alkenylcyclopentadiene reactant can be readily prepared from cyclopentadienyl sodium and an ankenyl chloride, as for example, the preparation of allylcyclopentadiene from allyl chloride and cyclopentadienyl sodium, as illustrated in Example I below.

Some of the alkenylcyclopentadiene compounds utilizable as one of the reactants for preparing the novel compounds of this invention include the following:

Allylcyclopentadiene
Methallylcyclopentadiene
(2-butenyl)cyclopentadiene
(2-ethyl-2-propenyl)cyclopentadiene
(2-butyl-2-propenyl)cyclopentadiene
(2-pentenyl)cyclopentadiene
(3-phenyl-2-propenyl)cyclopentadiene
(2-phenyl-2-butenyl)cyclopentadiene
(1,2-diethyl-2-propenyl)cyclopentadiene and the like.

The above listed compounds and other alkenyl-cyclopentadienes are reactive whether the alkenyl group is attached to the 1, 2 or 3 carbon atom of the cyclopentadiene, thus all such isomers of each compound listed are included. In many instances, a mixture of such isomers is preferred in the preparation of the novel unsaturated compounds of this invention.

Some of the alpha, beta-ethylenically unsaturated carboxylic acids and anhydrides thereof, utilizable as the other reactant for preparing the novel compounds of this invention include:

Acrylic acid
Methacrylic acid
Crotonic acid
(Alpha-ethyl) acrylic acid
(Alpha-butyl) acrylic acid
Maleic acid
Maleic anhydride
Fumaric acid
Itaconic acid
Mesaconic acid
Citraconic acid
Citraconic anhydride
Aconitic acid
Glutaconic acid and the like.

The novel unsaturated compounds of this invention are particularly useful in the preparation of unsaturated esters and polyesters. Unsaturated esters and polyesters prepared from the above described monocarboxylic adducts and polycarboxylic adducts, respectively, and an alcohol, such as butanol, amyl alcohol, heptanol, decanol and the like, are useful as reactive plasticizers for unsaturated polyester resins, and for other resins reactable with a >C=C< group. Other unsaturated esters and polyesters which can be prepared from the above described monocarboxylic adducts and polycarboxylic adducts, respectively, and an unsaturated alcohol, such as allyl alcohol, methallyl alcohol and the like, are useful as cross-linking agents for unsaturated polyester resins and other resins reactable with a >C=C< group.

Furthermore, it has been discovered that unsaturated polyesters prepared from the novel polycarboxylic adducts of this invention, and optionally an additional polycarboxylic acid, and a polyol were curable in the presence of air at low curing temperatures to a tack-free, solvent-resistant condition. (These desirable properties also result whenever another alpha, beta-ethylenically unsaturated polycarboxylic acid is included as one of the polyester reactants.) While these polyesters are curable without the addition of cross-linking monomers, it is generally preferred to admix them with a $CH_2=C<$ containing monomer prior to curing. Such $CH_2=C<$ containing monomers permit shorter curing times and add rigidity to the cured resin. These $CH_2=C<$ containing monomers are relatively inexpensive and are readily available, however, conventional polyester resins containing a large quantity of such monomers possess only slight flexibility. Thus, it is a further advantage of this invention that resins of unsaturated polyesters prepared from the above described novel polycarboxylic adducts and a relatively high ratio of $CH_2=C<$ containing monomer are surprisingly flexible.

The inclusion of an alpha, beta-ethylenically unsaturated polycarboxylic acid in these novel polyesters may be desirable in preparing unsaturated resins for particular uses inasmuch as these acids contribute to the rigidity of the resin. It is surprising, however, that the use of a small quantity of the novel polycarboxylic adducts of this invention along with an alpha, beta-ethylenically unsaturated polycarboxylic acid greatly improves the flexibility and permits curing to a tack-free, solvent-resistant state at a relatively low curing temperature. The quantity of novel polycarboxylic acid adduct necessary to accomplish this beneficial result ranges from about 5 percent by weight to 100 percent by weight of the total quantity of polycarboxylic acid used in preparing the polyester.

While this result is beneficial with alpha, beta-ethylenically unsaturated polycarboxylic acids generally, it is especially significant when maleic acid (including the anhydride) is the additional acid used in preparing the novel polyester. To achieve an equivalent cure, polyester resins prepared from maleic anhydride and various polyols require a higher curing temperature than polyesters prepared from other alpha, beta-ethylenically unsaturated polycarboxylic acids, such as fumaric acid, and the same type polyol. (Whenever the term "polyester resin" is used, it is contemplated generally that a $CH_2=C<$ monomer has been included therein.) Novel polyesters prepared from the novel polycarboxylic adducts of this invention, maleic acid and a polyol, cure with a $CH_2=C<$ containing monomer and an appropriate catalyst in the presence of air at temperatures as low as 140° F. or lower to a tack-free, solvent-resistant condition. These desirable properties result whenever the polyester resin contains as little as 5 parts of the novel polycarboxylic adducts of this invention to 95 parts of maleic acid. Conventional polyesters prepared from maleic anhydride, such as one prepared from maleic acid, phthalic acid and propylene glycol reaction product and equal parts of a $CH_2=C<$ containing monomer, require curing at temperatures of about 250° F. or higher in the presence of an appropriate curing catalyst to achieve a tack-free condition which is not solvent or abrasion resistant. Example 1 of United States Patent No. 2,852,487 describes the preparation and properties of a conventional propylene maleate polyester resin.

Some alpha, beta-ethylenically unsaturated polycarboxylic acids suitable as one of the components in the above described novel unsaturated polyesters include:

Maleic acid
Fumaric acid
Mesaconic acid
Citraconic acid
Glutaconic acid and the like, wherein the term "acid" is used to include corresponding anhydrides thereof.

Some polyols suitable for use in the preparation of the novel polyesters of this invention include:

Glycerol
Ethylene glycol
1,3-propylene glycol
Pentaerythritol
Diethylene glycol
Dipropylene glycol
Triethylene glycol and the like.

While the advantageous properties of these novel unsaturated polyesters are most pronounced when only unsaturated polybasic acids are utilized, the inclusion of saturated polybasic acids in some instances may be desirable. Such saturated polybasic acids include the following:

Phthalic acid
Isophthalic acid
Tetrahydrophthalic acid
Endomethylene tetrahydrophthalic acid
Tetrachlorophthalic acid
Succinic acid
Glutaric acid
Suberic acid
Sebacic acid and the like, wherein the term "acid" is used to include anhydrides thereof.

As mentioned hereinabove, these novel unsaturated polyesters are especially useful in the preparation of moldings, castings and coatings when cured with a $CH_2=C<$ containing monomer, such as styrene, vinyl toluene, alpha-methyl styrene, methyl methacrylate, divinyl benzene, dichlorostyrene, diallyl phthalate and the like.

The $CH_2=C<$ containing monomer can comprise up to about 70 percent by weight of the total resinous mixture.

These unsaturated polyester resin mixtures, wherein the term is used to describe a mixture of an unsaturated polyester and a $CH_2=C<$ containing monomer, are curable in the presence of conventional accelerators and catalysts used for curing unsaturated polyester resins. Such accelerators include cobalt octotate, cobalt naphenate, dodecyl mercaptan, diethyl aniline and the like. Such catalysts include methyl ethyl ketone peroxide, cumene hydroperoxide, benzoyl peroxide, lauroyl peroxide, acetyl peroxide and the like. The accelerator is generally utilized in quantities of 0.25 part to 1.5 parts per 100 parts of resin, and the catalyst is generally utilized in quantities of 0.25 part to 5 parts per 100 parts of resin.

The novel polyesters of this invention find utility in the preparation of castings, moldings and coatings which cure at low temperatures in the presence of air to a tack-free, solvent-resistant condition. This is particularly advantageous in coating applications, inasmuch as the exclusion of air and heating of the film to high temperatures is a practical impossibility in field applications, such as interior and exterior house coatings and the like.

The following examples illustrate in detail the preparation of the novel Diels-Alder adducts of this invention and the preparation of novel polyesters therefrom. The examples are not intended to limit the invention, however, for there are, of course, numerous possible variations and modifications.

EXAMPLE I

Allylcyclopentadiene was prepared from the following ingredients:

| | | |
|---|---|---|
| Tetrahydronaphthalene (redistilled) | milliliters | 300 |
| Sodium | grams | 23 |
| Cyclopentadiene | do | 83 |
| Isopropanol | do | 0.5 |
| Allyl chloride | do | 72 |

The sodium and tetrahydronaphthalene were added to a glass reaction vessel equipped with a stirrer and a thermometer. These materials were heated to about 100° C. before stirring was commenced. The temperature of the dispersion rose to about 130° C. and remained at that temperature for about 45 minutes before it was rapidly cooled to about 40° C., at which temperature the dropwise addition of cyclopentadiene and isopropanol was begun. This addition required about 30 minutes. The reaction mixture was stirred for a period of about 2 hours at 30° C. before the allyl chloride was added. After the allyl chloride addition, the reaction mixture was stirred for about 1½ hours at 30° C. and for an additional 30 minutes at about 55° C.

The resulting reaction mixture was distilled and the fraction boiling at 27° C. at about 10 millimeters of mercury pressure was collected. The index of refraction of this product was 1.4736. A microanalysis of this material showed the following composition:

| | Percent |
|---|---|
| Carbon | 90.37 |
| Hydrogen | 9.59 |

This compared favorably with the calculated composition of allylcyclopentadiene:

| | Percent |
|---|---|
| Carbon | 90.50 |
| Hydrogen | 9.50 |

EXAMPLE II

Allyl bicyclo(2.2.1)hept-5-ene-2,3-dicarboxylic acid anhydride was prepared from 10.6 grams of the product of Example I having an index of refraction of 1.4736 and the following ingredients:

| | | |
|---|---|---|
| Hexane | milliliters | 50 |
| Maleic anhydride | grams | 9 |

The allylcyclopentadiene (Example I distilled product) was admixed with the hexane in a glass reaction vessel equipped with a stirrer and thermometer. The maleic anhydride was added and the reaction mixture exothermed. The temperature of the mixture was maintained at about 45° C. by cooling. Stirring was continued for about 6 hours after the maleic anhydride addition. Upon standing, the reaction mixture separated into two layers, the upper layer being essentially hexane.

The bottom layer was distilled and the fraction having a boiling point of about 126° C. to 133° C. at 0.15 millimeter of mercury pressure was collected. This fraction had an index of refraction of 1.5103. A microanalysis of this material showed the following composition:

| | Percent |
|---|---|
| Carbon | 70.42 |
| Hydrogen | 6.04 |

This compared favorably with the calculated composition of allyl bicyclo(2.2.1)hept-5-ene-2,3-dicarboxylic acid anhydride:

| | Percent |
|---|---|
| Carbon | 70.57 |
| Hydrogen | 5.88 |

EXAMPLE III

Methallyl bicyclo(2.2.1)hept-5-ene-2,3-dicarboxylic acid anhydride was prepared from the following ingredients:

| | | |
|---|---|---|
| Toluene (redistilled) | milliliters | 300 |
| Sodium | grams | 23 |
| Cyclopentadiene | do | 83 |
| Isopropanol | do | 0.5 |
| Maleic anhydride | do | 98 |
| Skelly F | milliliters | 180 |
| Methallyl chloride | grams | 91 |
| Benzene (dry) | millimeters | 100 |

The sodium and toluene were added to a glass reaction vessel equipped with a stirrer and thermometer. These materials were heated to about 100° C. before stirring was commenced. The temperature was maintained at 107° C. for about ½ hour before rapidly cooling the dispersion to about 40° C., at which temperature the cyclopentadiene and isopropanol were added. The mixture exothermed slightly. Agitation of the mixture was continued for 4 additional hours while the temperature was maintained at about 25° C. The temperature of the mixture was then reduced to about 15° C. and the methallyl chloride was added, causing the reaction mixture to exotherm slightly. Agitation was continued at room temperature for approximately 1 hour.

To another glass reaction vessel equipped with a stirrer, reflux condenser and thermometer were added the maleic anhydride and Skelly F solvent. The above reaction product was then added to this vessel. The mixture exothermed slightly; the temperature rising from about 21° C. to about 24° C. Dry benzene was then added and the reaction mixture was stirred for an additional period of about 1 hour.

The reaction product was distilled and 125 grams of distillate boiling at 152° C. to 155° C. at 1 millimeter of mercury pressure were recovered. This fraction was redistilled and the distillate boiling at 138° C. to 139° C. at 0.7 to 0.8 millimeter of mercury pressure was retained. The index of refraction of this material was 1.5092 at 25° C.

This material was polymerizable in the presence of a boron trifluoride-acetic acid complex. A dark, viscous oil was formed.

The calculated composition of methallyl bicyclo-(2.2.1)hept-5-ene-2,3-dicarboxylic acid anhydride is:

| | Percent |
|---|---|
| Carbon | 71.54 |
| Hydrogen | 6.46 |
| Oxygen | 21.99 |

The composition of the redistilled fraction as determined analytically was:

| | Percent |
|---|---|
| Carbon | 70.56 |
| Hydrogen | 6.04 |

The remaining element was considered to be oxygen.

An infrared analysis revealed the presence of a hydroxyl group, thus indicating that some of the anhydride had been converted to acid, thereby explaining the slight discrepancy between the theoretical and analytical compositions.

EXAMPLE IV

An unsaturated polyester resin was prepared from the following ingredients:

| | | |
|---|---|---|
| Allyl bicyclo(2.2.1)hept-5-ene-2,3 - dicarboxylic acid anhydride (Example II product) | grams | 80 |
| Maleic anhydride | do | 38 |
| Diethylene glycol | do | 86 |

The above ingredients were admixed in a glass reaction vessel equipped with a stirrer, thermometer and reflux condenser. This mixture was heated to about 175° C. for about 6 hours. (The acid number was 44.5 after 5 hours of heating.) Hydroquinone (0.2 gram) was added to the reaction mixture after it had been cooled to 145° C. After further cooling to 100° C., the reaction mixture was thinned with 66 grams of styrene. The resin had a total solids of 70 percent by weight.

Cobalt octoate (0.2 milliliter) and methyl ethyl ketone peroxide were added to 20 grams of the above polyester. A film was drawn which gelled in about 40 minutes at room temperature and in the presence of air. After the film was cured at 140° F. in the presence of air, it was flexible, tack-free and very solvent-resistant.

Although specific examples of the invention have been set forth hereinabove, it is not intended that the invention be limited solely thereto, but to include all the variations and modifications falling within the scope of the appended claims.

I claim:
1. The Diels-Alder adduct of an alkenyl substituted cyclopentadiene having the structure:

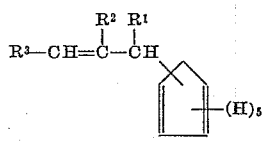

wherein $R^1$, $R^2$ and $R^3$ are members of the class consisting of hydrogen, monocyclic aryl and lower alkyl groups, and a member of the class consisting of an alpha, beta-ethylenically unsaturated carboxylic acid and an alpha, beta-ethylenically unsaturated anhydride, said acid and anhydride containing from about 4 to about 7 carbon atoms.

2. The Diels-Alder adduct of an alkenyl substituted cyclopentadiene having the structure:

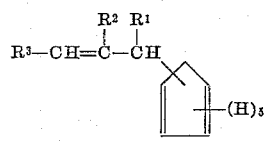

wherein $R^1$, $R^2$ and $R^3$ are members of the class consisting of hydrogen, monocyclic aryl and lower alkyl groups, and a member of the class consisting of an alpha, beta-ethylenically unsaturated dicarboxylic acid and an alpha, beta-ethylenically unsaturated anhydride, said acid and anhydride containing from about 4 to about 7 carbon atoms.

3. The Diels-Alder adduct of claim 2 wherein the alkenyl substituted cyclopentadiene is allylcyclopentadiene.

4. The Diels-Alder adduct of claim 2 wherein the alkenyl substituted cyclopentadiene is methallylcyclopentadiene.

5. The Diels-Alder adduct of allylcyclopentadiene and maleic acid.

6. The Diels-Alder adduct of methallylcyclopentadiene and maleic acid.

References Cited by the Examiner

UNITED STATES PATENTS

| | | | |
|---|---|---|---|
| 2,475,731 | 10/1944 | Weith | 260—871 |
| 2,479,486 | 8/1949 | Gerhart | 260—871 |
| 2,818,417 | 12/1957 | Brown et al. | 260—429 |
| 2,951,823 | 9/1960 | Sauer | 260—871 |

FOREIGN PATENTS 646,985 12/1950 Great Britain.

NICHOLAS S. RIZZO, *Primary Examiner.*

MURRAY TILLMAN, *Examiner.*

J. T. GOOLKASIAN, *Assistant Examiner.*